(12) United States Patent
Pratt

(10) Patent No.: US 6,226,174 B1
(45) Date of Patent: May 1, 2001

(54) ELECTRICAL FITTING

(75) Inventor: Ross Gregory Pratt, Whangaparaoa (NZ)

(73) Assignee: BEP Marine Limited, Auckland (NZ)

( * ) Notice: Subject to any disclaimer, the term of this patent is extended or adjusted under 35 U.S.C. 154(b) by 0 days.

(21) Appl. No.: 09/405,167

(22) Filed: Sep. 24, 1999

(30) Foreign Application Priority Data

Sep. 24, 1998 (NZ) ........................................ 332028

(51) Int. Cl.[7] ........................................................ H02B 1/00
(52) U.S. Cl. .......................... 361/600; 361/631; 361/643; 361/673; 361/837; 174/58; 174/65 R; 200/307
(58) Field of Search ........................................ 361/600, 606, 361/623, 629–636, 640, 652, 655–658, 823, 824, 833, 834; 174/53, 54, 58, 59, 65 R, 65 SS; 200/307, 293; 439/501, 365, 131

(56) References Cited

U.S. PATENT DOCUMENTS

| | | | |
|---|---|---|---|
| 3,970,812 | * | 7/1976 | Nowack ................................ 200/307 |
| 4,165,443 | * | 8/1979 | Figart et al. ............................ 174/53 |
| 4,592,972 | * | 6/1986 | Juergens et al. ...................... 429/160 |
| 4,695,116 | * | 9/1987 | Bailey et al. ......................... 439/188 |
| 4,958,048 | * | 9/1990 | Bell ....................................... 174/53 |
| 4,986,762 | * | 1/1991 | Keith .................................... 439/131 |
| 5,039,929 | * | 8/1991 | Veistroffer et al. .................. 320/107 |
| 5,078,614 | * | 1/1992 | Shotey ................................. 439/136 |
| 5,562,488 | * | 10/1996 | Neiser et al. ........................ 439/501 |
| 5,574,255 | | 11/1996 | Simmons . |
| 5,703,327 | | 12/1997 | Jorgensen . |

FOREIGN PATENT DOCUMENTS

| | | | |
|---|---|---|---|
| 0 535 500 | | 4/1993 | (EP) . |
| 0 535 500 A1 | * | 4/1993 | (EP) ................................. H02G/3/08 |

* cited by examiner

*Primary Examiner*—Leo P. Picard
*Assistant Examiner*—Boris Chervinsky
(74) *Attorney, Agent, or Firm*—Young & Thompson

(57) ABSTRACT

A modular electrical fitting suitable for the instrument panel of a motor boat, has a plastic housing 8, 9, 10, having a rectangular foot print, with each side having a shaped upper edge, and a connection cavity 11 positioned in the uppermost portion of each side edge, so that the modular unit 8, 9, 10 can be connected together by means of a resilient joining device 13, which can be pushed in place to physically connect two of the modular units together as shown between units 8 and 9. This enables the modular units to be held together from above, whilst the underside of the units can be connected together by brass bus bars or the like to provide a secure electrical connection between adjacent units, so that the modular units can be connected together box physically and electrically. Each of these modular units 8, 9, 10, etc can be provided with a switch, fuse, or other electrical component, so that the modular units can be connected together to form an entire switchboard or instrument panel.

14 Claims, 8 Drawing Sheets

ELECTRICAL FITTING

TECHNICAL FIELD OF THE INVENTION

This invention relates to an improved electrical fitting, and has particular but not sole application to low voltage, high current fittings such as switches or fuses used in boats and caravans.

OBJECT

It is an object of the invention to provide an improved electrical fitting, or one which will at least provide the public with a useful choice.

STATEMENT OF INVENTION

Accordingly in one aspect the invention may broadly be said to consist of an improved electrical fitting, said fitting have a housing containing one or more electrical components, the said housing being adapted to be connected to an adjacent fitting of similar configuration by way of joining means.

Conveniently the said joining means is a separate removable unit and physically connects two adjacent fittings together.

Preferably the said joining means is accessible from the top of the fittings.

Preferably the said housing is substantially hollow.

Preferably the said housing is adapted to contain a switch, fuse, electrical circuits, connection points or other forms of electrical components.

Preferably the said housing has a removable base member allowing access to the said electrical components held within the said housing through the bottom of the fitting.

Preferably a portion of at least one side of the said housing is adapted to be removed or replaced as desired to form an access aperture to the interior of the fitting.

Conveniently the fitting may be electrically connected to other fittings by passing electrical connection means from one fitting to the other through the removed access apertures of the fittings.

Preferably the said housing is adapted to receive and interact with electrical switch members or the like.

Preferably fitting means are provided to securely affix the fitting to a surface.

Conveniently the said fixing means are situated around the periphery of the said housing.

Preferably the fitting is configured in such a way that adjacent fittings may be securely joined together by the said joining means to form a cluster and then electrically connected together, before mounting on or to a surface.

Preferably at least one side of the said housing of the said fitting may be configured to form a mating face, thereby allowing the said mating face of the said fitting to be securely joined together with another fitting.

Preferably the fitting may be joined together with at least one other fitting of similar configuration by bringing the said mating faces of each fitting into a face-abutting relationship and securely joining the fittings together by way of the said joining means.

Preferably the said electrical connection means comprises a solid bar of electrically conductive material or at least one wire of electrically conductive material.

Preferably the said electrical connection means is made of brass.

Preferably the said joining means may be positioned substantially at the top of the said housing.

Preferably the said housing may be adapted to receive key engagement means.

To those skilled in the art to which the invention relates, many changes in construction and widely differing embodiments and applications of the invention will suggest themselves without departing from the scope of the invention as defined in the appended claims. The disclosures and the description herein are purely illustrative and we not intended to be in any sense limiting.

DRAWINGS

These and other aspects of the invention which will be considered in all of its novel aspects, will become apparent from the following description, which is given by way of example only, with reference to the accompanying drawings, in which.

PREFERRED EMBODIMENT

Figures 1, 1A, 1B, 1C:
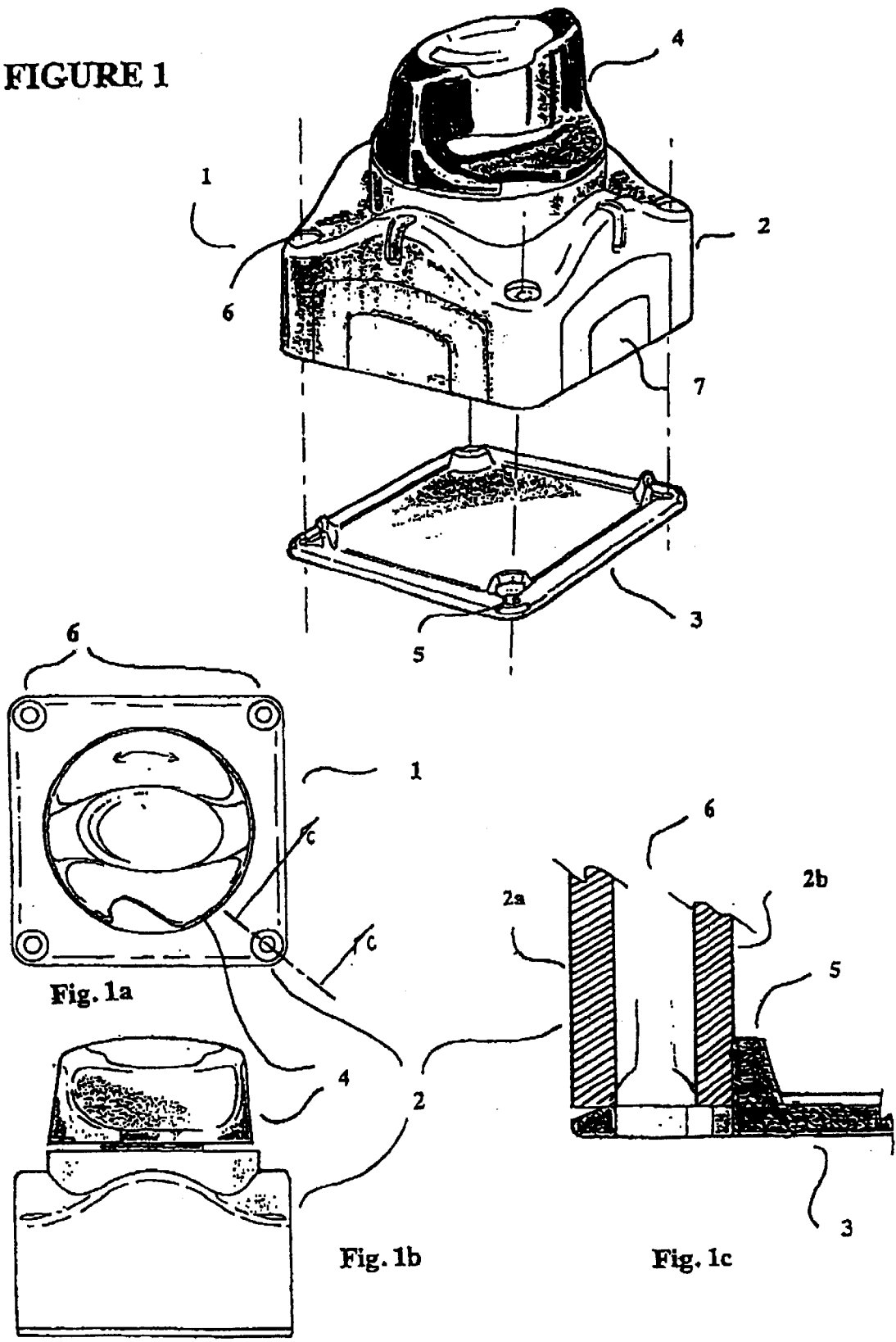
FIGS. 1 and 1a–1c show an electrical fitting as herein described by the specification.

In FIG. 1 an example of the electrical fitting 1 as described above is shown.

In the preferred embodiment of the invention the fitting will be used in situations where a substantially heavy-duty electrical fitting is required, for example, in the electrical circuit boards of caravans or the instrument panels of motor-boats and yachts.

When used in such circumstances, the fitting should ideally be constructed of hard wearing materials such as plastic composites or the like. Whatever material is chosen, it should have the required insulation properties to ensure the fitting meets all necessary safety standards. If the fitting is to be used in circumstances where it may be exposed to the elements (for example, in a nautical environment), then adequate protection measures should be provided, such as waterproof seals or other barriers, to prevent the ingress of dirt, water etc, into the fitting.

The shape and configuration of each fitting should be such that a can be joined securely together with another fitting of similar shape and configuration. This requirement is particularly useful when working with two or more fittings at once, when wiring the fittings before installation for example. That is, it would be easier to work with a number of fittings securely joined together in a group or cluster than it would be if each fitting were unattached and independent of the other fittings. In addition such fittings could be sold pre-assembled in clusters and already wired, thereby greatly reducing installation time.

In the simplest example of the invention, the fitting has a housing 2 with a substantially square configuration, having four sides and a base portion 3. Other configurations of the fitting are also possible while still achieving the objectives of the invention. For example, the housing could be configured in a substantially crescent shape. Alternatively any symmetrical configuration would be suitable, such as a hexagon, triangle or the like. Ideally whatever configuration of housing is chosen, at least one side of the housing should be able to be snugly "mated" together with one side of another housing of similar configuration.

Depending on the desired use of the fitting, the fit housing will contain some form of internal electrical components such as fuses and/or switches (not shown). The complexity and number of such components will depend of the actual use of the fitting. In the example of the invention shown in FIG. 1, the housing 2 has been adapted to engage and interact with a switch member 4.

In the preferred embodiment of the invention the housing will be substantially hollow to accommodate the internal electrical components. To allow access to the components held wits the fitting, housing 2 and base portion 3 have been configured such that base portion 3 may be removed and replaced as desired. In the example of the invention as shown in FIG. 1, base portion 3 has gripping lugs 5 which securely grip the interior walls of the housing 2. The gripping lugs 5 ensure the base portion 3 remains firmly attached to the housing 2 once base portion 3 is into the bottom of the fitting. How this is achieved may be seen more clearly from the cross-section of one corner of the fitting shown in FIG. 1c, seen along the line C—C as shown in FIG. 1a. This cross-section shows exterior wall 2a and interior wall 2b of the housing 2, with base portion 3 having been inserted into the base of the fitting. As can be seen from FIG. 1c, gripping lug 5 has been brought into tight contact with interior wan 2b. While the base portion 3 may be easily removed when desired the contact effect of the gripping lugs 5 ensures the base portion will not come away easily from the housing, thereby exposing the electrical contents of the fitting. In keeping with the objectives mentioned above of preventing the ingress of water, dirt etc. to the interior of the fitting, base portion 3 could also be adapted to include seals constructed of rubber or some other suitable material for use in conjunction with, or as an alternative to, gripping lugs 5.

As mentioned above, it is desirable to configure each fitting in such a way that it may be joined together with one or more other fittings of similar configuration to form a cluster of fittings. Once securely joined together the cluster of fittings may be turned over and the base portion of each fitting removed, thus allowing the fittings to be wired together as a single unit. To see how the fittings may be joined together, reference is made to FIGS. 1, 2 and 3.

Figure 2:
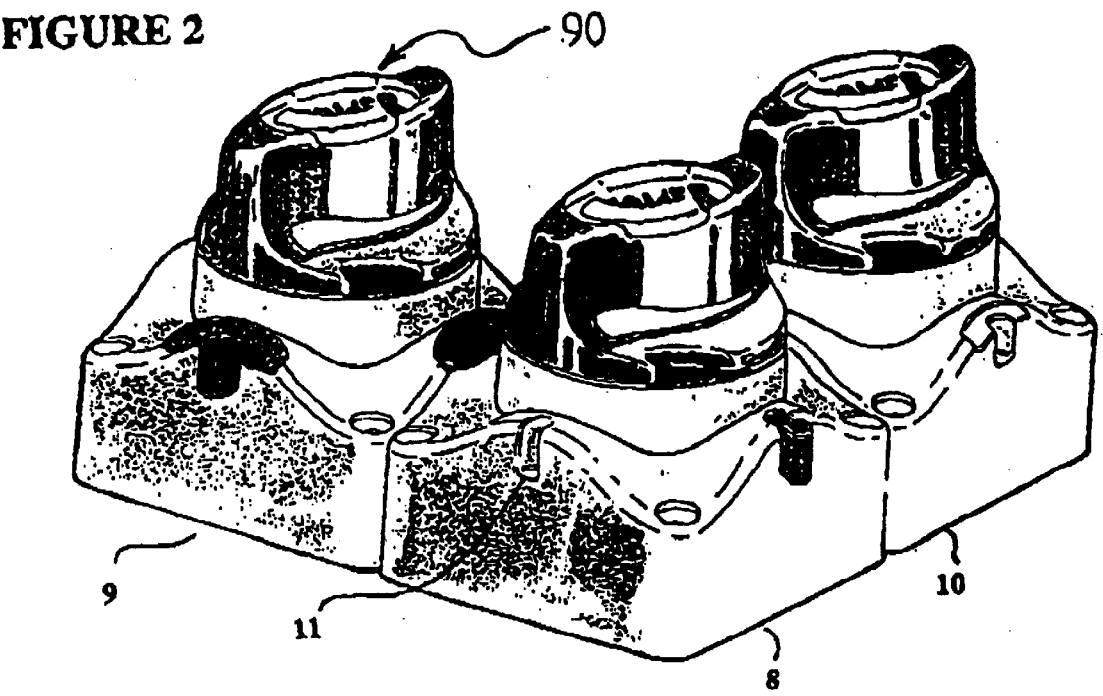
FIG. 2 and 2a–2c show a group of electrical fittings as herein described by the specification.
Figure 2:
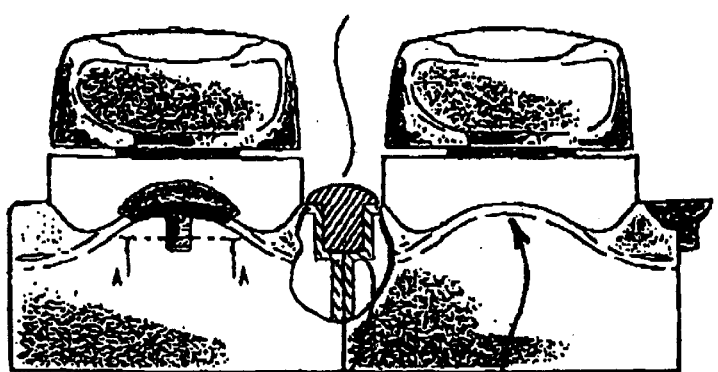

In FIG. 2, one example of how a cluster of fittings may be securely joined together is shown.

In the example shown, each side of the fitting contains a connection cavity 11. In this case the connection cavity has been moulded into the side of the fitting housing during the manufacture of the fitting. More than one such cavity may be provided if desired on each side of the fitting.

Figure 2A:

Once abutted together, as shown in FIG. 2a, the connection cavities of each fitting housing substantially minor one another, thereby forming a set of "jaws" or a larger joining cavity 12 into which a joining device 13, in hiss case in, the form of a plug, may be inserted, thereby joining the two fittings securely together.

The relationship between the joining cavity 12 and the joining device 13 is important as in the preferred embodiment of the invention it determines how securely the fittings may be joined together. Ideally no other joining means apart from joining device 13 will be required to ensure the fittings are securely joined together (although further joining support could be provided from the electrical connection means passing between the fittings). Therefore it is preferred that whatever the final configuration of joining cavity 12, the joining device 13 should be configured to tightly fit into the joining cavity 12 to firmly grip the connection cavities of both fittings. How this maybe done can be seen if the cross-section along line A—A, as shown in FIG. 2a.

Figure 2B:
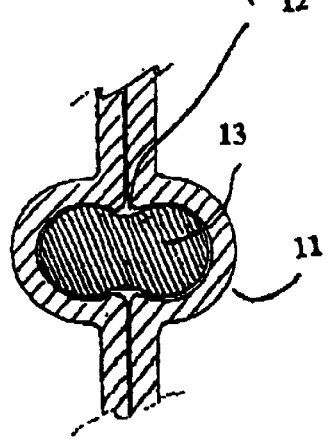
Figure 2C:
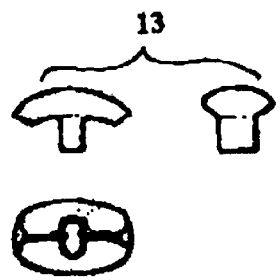

In the preferred embodiment of the invention the joining devices will be constructed of a rubber composite material. Ideally this material will have limited expansion properties and be constructed of such size and dimensions that a reasonable force is required to insert the joining device into joining cavity 12. In addition, once the joining device is instead into the joining cavity, the device should firmly grip the walls of the connection cavities of the respective housings such that the housings are held firmly together. Different versions of the joining device are shown in FIG. 2c. Examples are shown with flush heads, to form a substantially flush finish with the surface of the housing, thus increasing the overall aesthetic appeal of the fitting. The joining devices may be moulded or extruded to the desired shape. As seen in FIG. 2b, in the preferred embodiment of the invention the joining devices have a substantially dumbbell shape.

Figure 3:
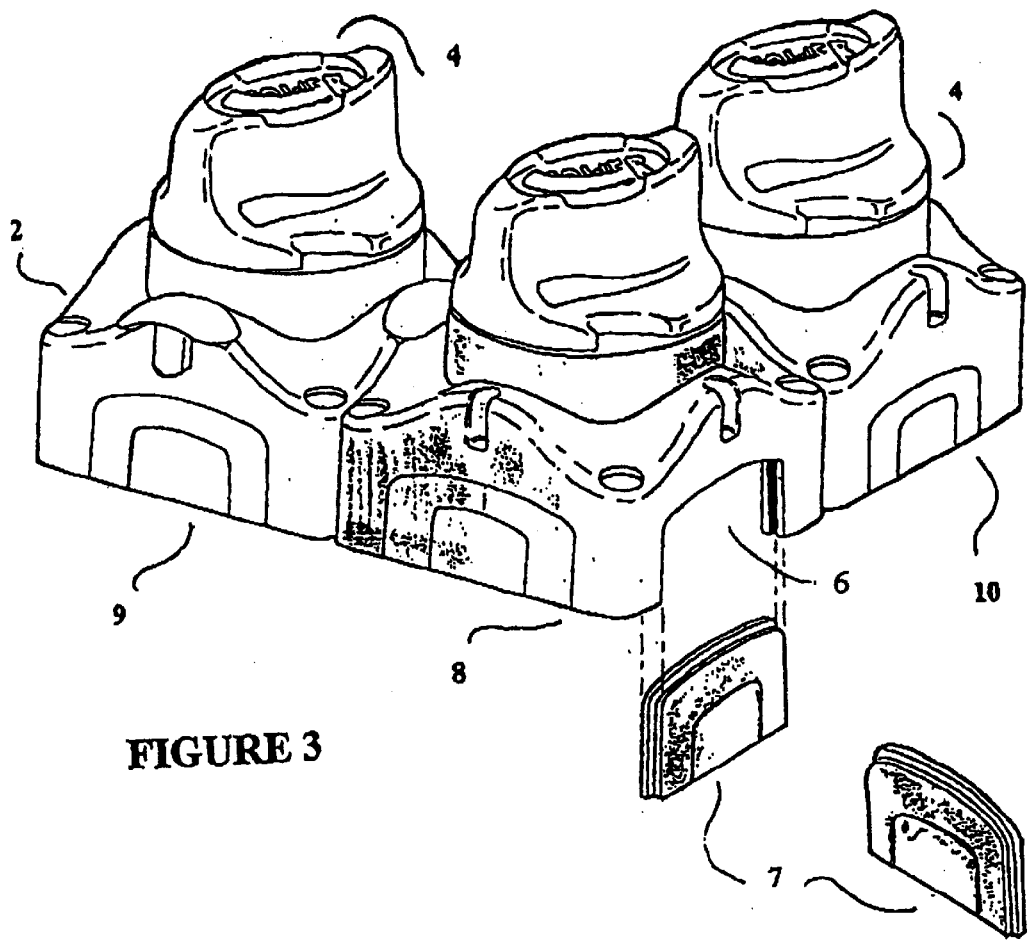
FIGS. 3 and 3a–3b show a group of electrical fittings as herein described by the specification.

In the example of the invention shown in FIGS. 1, 2 and 3, each housing 2 is configured to have an access aperture 6 in at least one side face of the housing. In the preferred embodiment of the invention, each fitting will be electrically connected to one or more of the other fittings in the cluster by way of these access apertures. The number of access apertures in each fitting will determine how many other fittings a first fitting may be mated with For example, if the housing has a substantially square configuration as shown in the preferred embodiment and has only one access aperture, only one other fitting may be mated with the fitting. Alternatively, if the fitting has two access apertures, it may be mated with two other fittings, and so on.

In the example of the invention shown in FIGS. 2 and 3, two sides of fitting 8 have been abutted into contact with one side of fittings 9 and 10. In the preferred embodiment of the invention, the fittings may be mated together in a cluster formation as shown in the drawings. Once the fittings are joined, each fitting can be electrically connected with the other fittings in the cluster. As mentioned above, ideally the electrical connection of the fittings is achieved via the access apertures. In the example shown in FIGS. 2 and 3, the access aperture of each face abutted to the face of another fitting is removed prior to the joining of the fittings is together, thereby allowing electrical connection means to pass through the open access apertures, from one fitting to another.

Figure 3A:
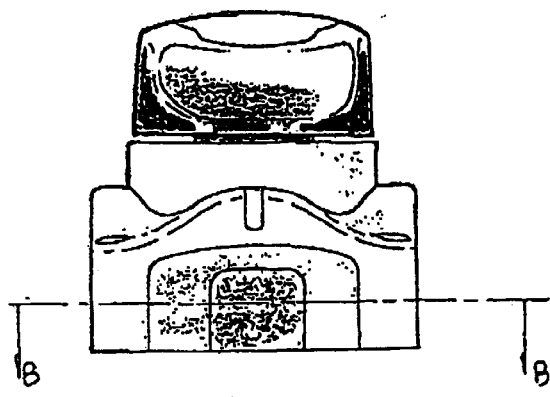
Figure 3B:

In FIG. 3, one example of how the access apertures may be removed is shown. In this case, cover plate 7 may be slidably removed from housing 2 to leave an aperture 6. Ideally housing 2 and cover plate 7 are configured such that cover plate 7 may be easily removed and replaced as desired For example, FIGS. 3a and 3b show one example of the configuration of cover plate 7 and the internal walls of housing 2, by the cross-section shown along the Line B—B.

Ultimately the complexity of the electrical housing means will depend to some degree on the complexity of the fitting itself and the use to which the fitting is put. It is expected the fittings will be used in situations requiring 12/24V and current of around 200–300 amperes. The housing of each fitting will contain electrical connection points of some sort, to which the electrical connected means can be connected. In one example of the invention the fittings could be connected by way of a solid bar constructed of a electrically conductive material such as brass or the like. A solid bar bas the advantage that it further adds to the strength of the bond between two fittings as they are locked together in the cluster. This further enhance the ability of the fittings to be put together off-site and then taken to the desired location in one piece and installed.

Figure 4:
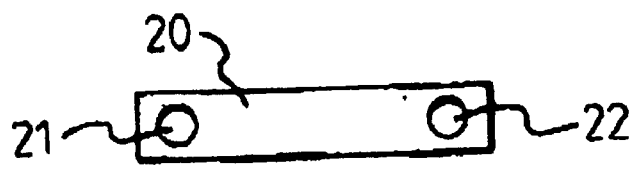
FIG. 4 shows a rigid terminal link capable of physically and electrically connecting the modules together.
Figure 5:
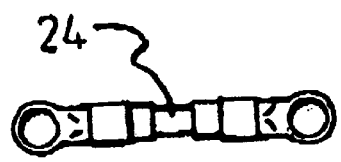
FIG. 5 shows a flexible terminal link.
Figure 6:
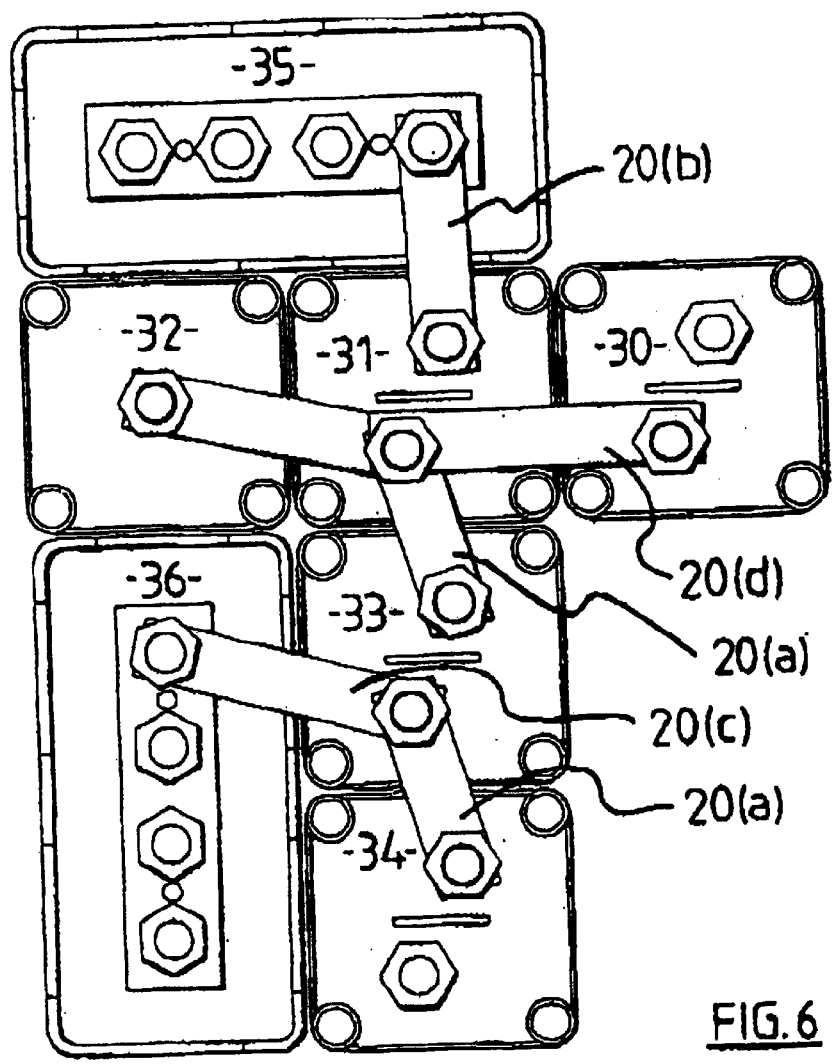
FIG. 6 shows an underside plan view of an electrical distribution system made up of a number of modules connected together by the rigid links of FIG. 4. This view shows the bottom plates removed, so that the electrical connections between fittings can be illustrated.

Alternatively, the electrical connection means could comprise braided wire with circular connection clips at each end. The use of such a connection means may also contribute to joining the fittings together, particularly if the wire is connected between the fittings under tension These connectors are shown in FIGS. 4 and 5. FIG. 4 shows an example of one such rigid connector 20, conveniently made of brass having apertures 21, 22 at either end thereof. Although such rigid links 20 can be made in a number of different sizes, we have found that the most convenient sizes to allow interconnection of the various modules, in different modes, by a series of four links having the following dimensions from centre to centre;

(a) 42.5 mm centre to centre
(b) 64.5 mm centre to centre
(c) 64.5 mm centre to centre
(d) 68.5 mm centre to centre These rigid links enable connection of the units as shown in FIG. 6, where the various links are labelled with a numeral 20 and the suffix (a)–(d) relating to their length. Further information on the link connections can be obtained from the applicant's website www.bep.co.nz.

In some installations, the solid links do not reach the correct terminal, and for this purpose a flexible link (as described above) 24 can be used. These can be provided in a range of sizes and/or diameters. We have found it convenient to supply the following lengths of flexible links allowing for a wide variety of possible interconnections. Links having a cross-sectional area of 10 $m^2$ square metres can be provided in lengths of 100 mm, 150 mm, 200 mm, 300 mm, and for heavy duty applications we also provide lengths of 25 $m^2$ cross-sectional area in lengths of 150 mm, 200 mm, and 300 mm.

In FIG. 6 a variety of modules can be connected together both electrically and physically. As shown in FIG. 6 modules come in two standard sizes, small modules having a square footprint, designated by the numerals 30, 31, 32, 33 and 34, and two larger modules of rectangular footprint, modules 35 and 36.

Figure 7:
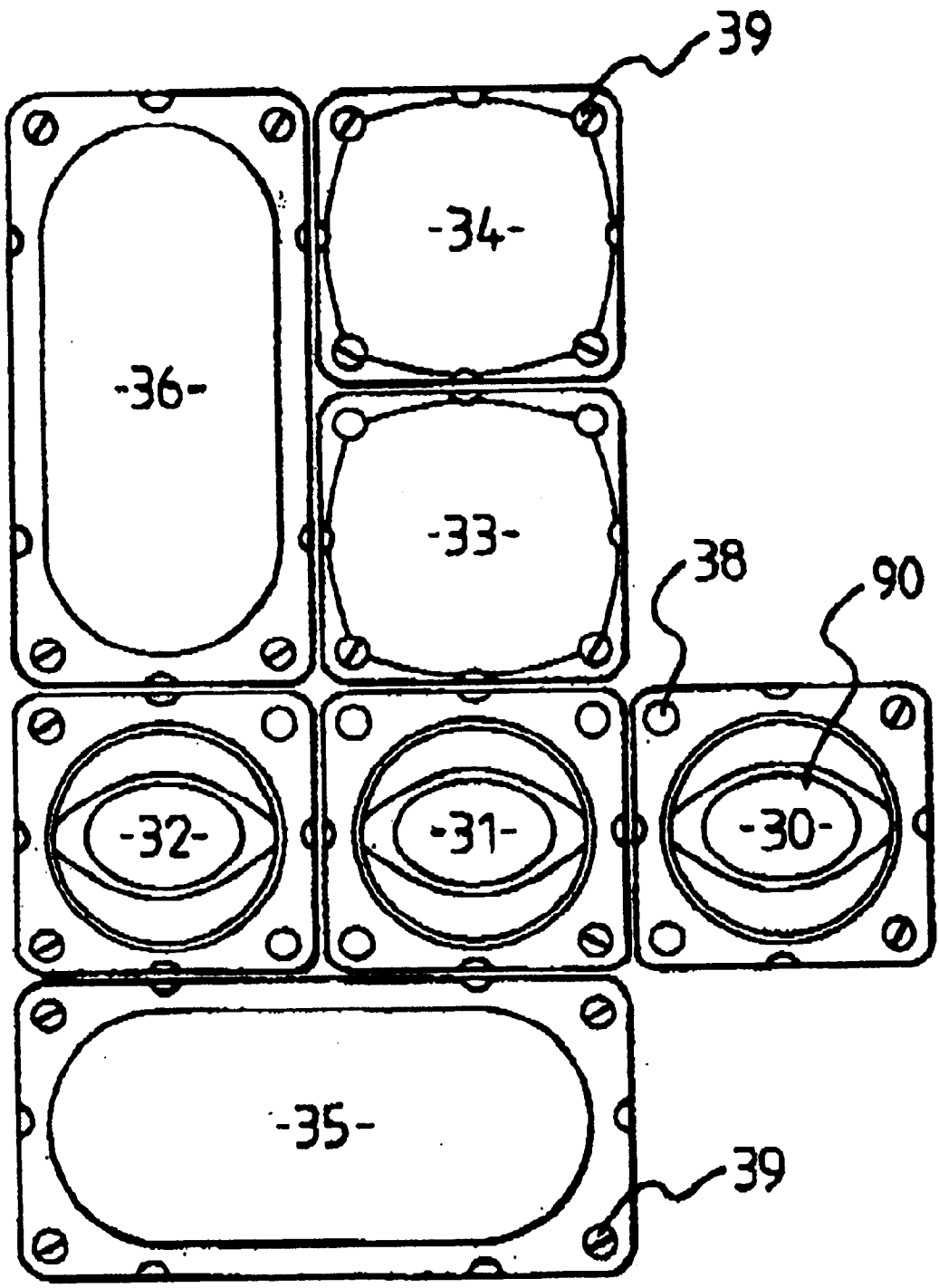
FIG. 7 shows a top plan view of the electrical distribution system made up of the modules of FIG. 6.

To assemble an electrical distribution system, particularly suited for use on boats, the modules can be placed in abutting relationship, as shown in FIGS. 6 and 7, and can be physically locked together by the use of the joining means 13, which when applied to the top side of the modules as shown in FIG. 7 will enable the modules to be held together, in a desired configuration, and then with their base plates removed the modules can be inverted, and electrical connections can be made using the solid link 20, or the flexible links 24, as desired. After the links have been connected to the modules, the base plates can be reconnected to the modules, the entire assembly can then be tuned the right way up (as in FIG. 7) with the base plates placed on the deck, and the modules attached to the deck, or some portion of the boat, by screws or other fasteners. It would be appreciated that prior to assembling the modules together as shown in FIGS. 6 and 7, the person building the distribution system will remove the cover plates 7 from those portions of the modules where they abut one another so that there is an access aperture between abutting modules through which the solid or flexible links 20 or 24 can pass.

The entire unit can be then screwed to the deck by screws or other fastener shown by the slotted circles 39 at least on the periphery of the assembly. Preferably all of the apertures are provided with screws, so that the assembly is securely mounted to the appropriate portion of a boat or the like. However it will be appreciated that the interconnection between the modules via the solid links 20 will provide for location of the modules, particularly modules in the centre of the assembly, to assist in holding them in place.

Figure 8:
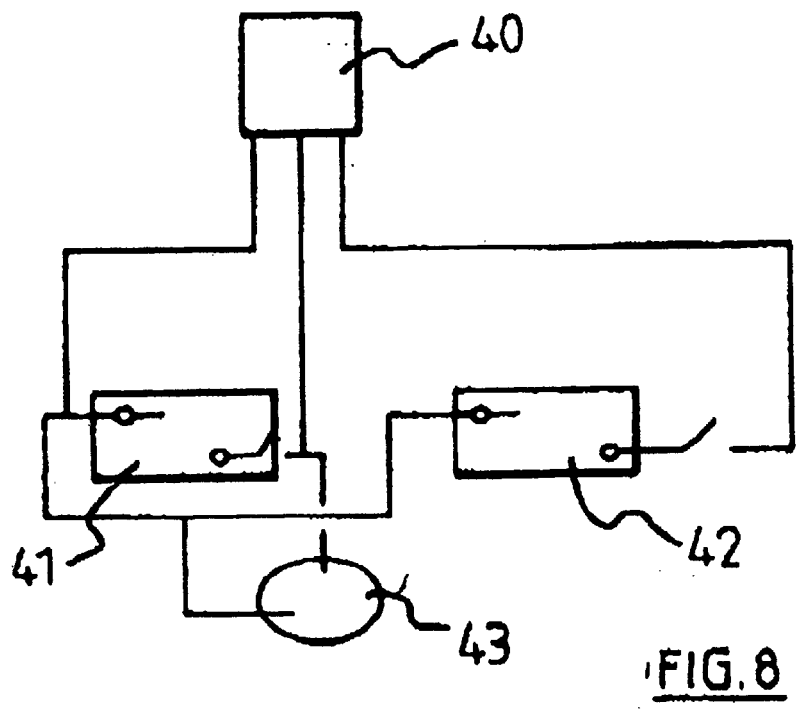
FIG. 8 is a schematic circuit diagram for a voltage sensitive relay enabling two batteries to be used on a boat.

FIG. 8 shows how one such assembly could be configured to enable a boat to have two separate batteries 41 and 42, controlled by a voltage sensitive relay 40. This enables the boat to have one battery 41 for starting the engine, and a separate "house battery" for the control of more sensitive electronics, so that battery 42 can be isolated by the voltage sensitive relay 40, when the engine 43 is restarted, This relay 40 stays open when the engine is first stated and remains open during charging until the battery 41 has reached a preset voltage, typically 13.7 volts in the case of a 12 volt battery used for boats, The relay will then close, allowing the two batteries 41, 42 to be charged together. When the engine is stopped, the voltage retruns to normal levels which allows the relay to open again, separating the two batteries, and thus eliminating the possibility of discharging the wrong battery at startup. Numeral 43 shows the starter motor connected to the engine.

Figure 9:
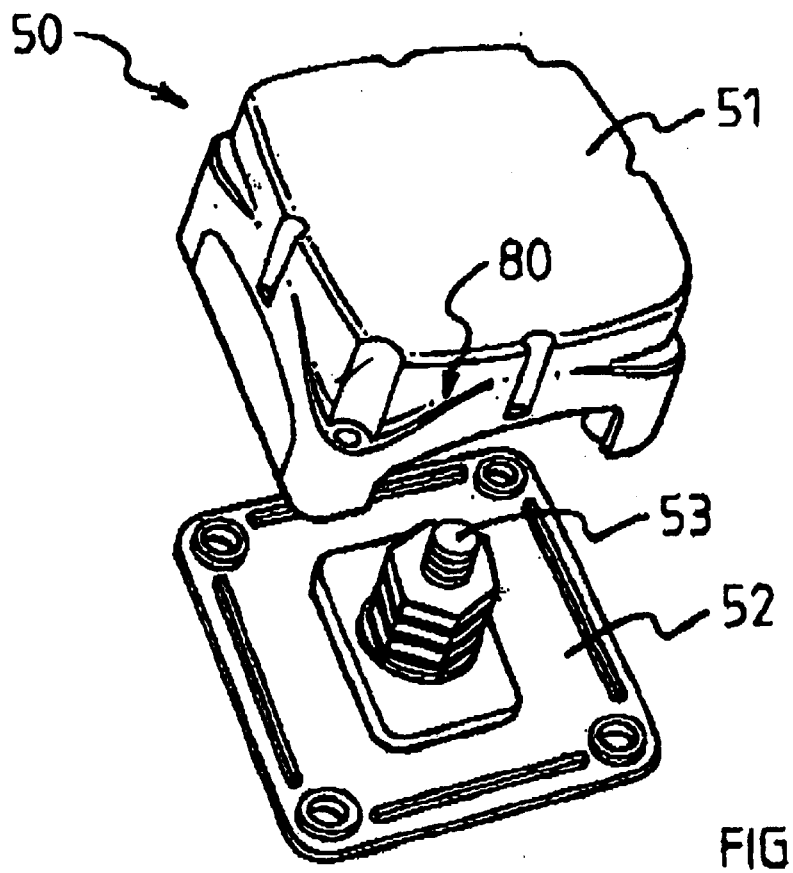
FIG. 9 is an exploded view of a module having a square footprint, containing a distribution stud to allow termination of heavy duty cables for one or more connections.

FIG. 9 shows an exploded view of a module stud 50 having a removable cover 51, a base plate 52 and a distribution stud 53 mounted therein which allows termination of heavy duty cables for one or more connections. By using the standard square footprint contour lock fitting with removable side plates (as described above) it is possible to allow for connections to the distribution studs 53 from all sides, utilising the link bars 20 or 24.

Figure 10:
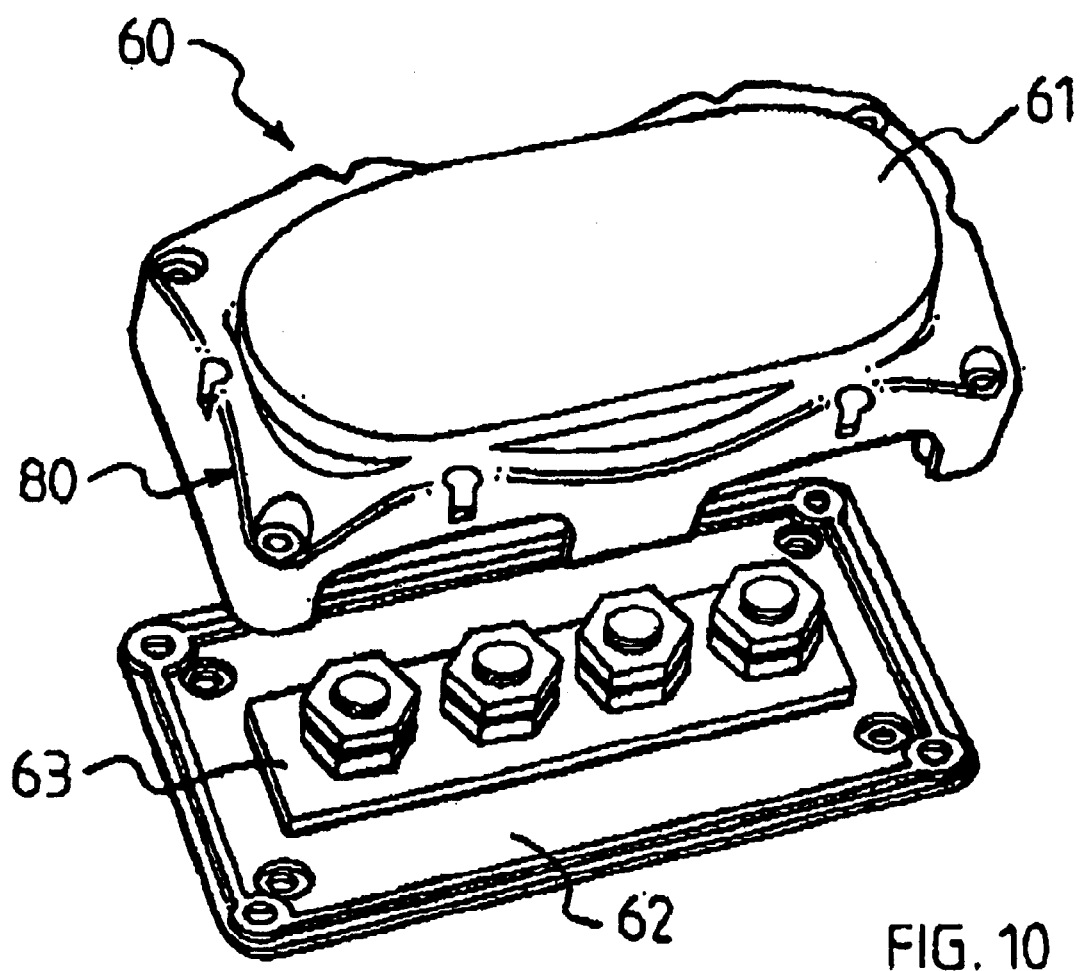
FIG. 10 is an exploded view of a module having a rectangular footprint (equivalent to two of the smaller modules having the square footprint). This module contains a contour distribution bus.

FIG. 10 shows a module 60 for a distribution bus having a cover 61, a rectangular footprint base plate 62 and distribution bus 63 having a number of studs mounted thereon, each of which can receive multiple terminations for heavy duty and negative or positive connections. Again modular sizing with the contour lock mouldings allows easy grouping, and easy connection to the module from either side. As shown in FIG. 10 this rectangular module has provision for two access apertures on each side. This rectangular contour module is equivalent to two of the square footprint modules 50 shown in FIG. 9.

Figure 11:
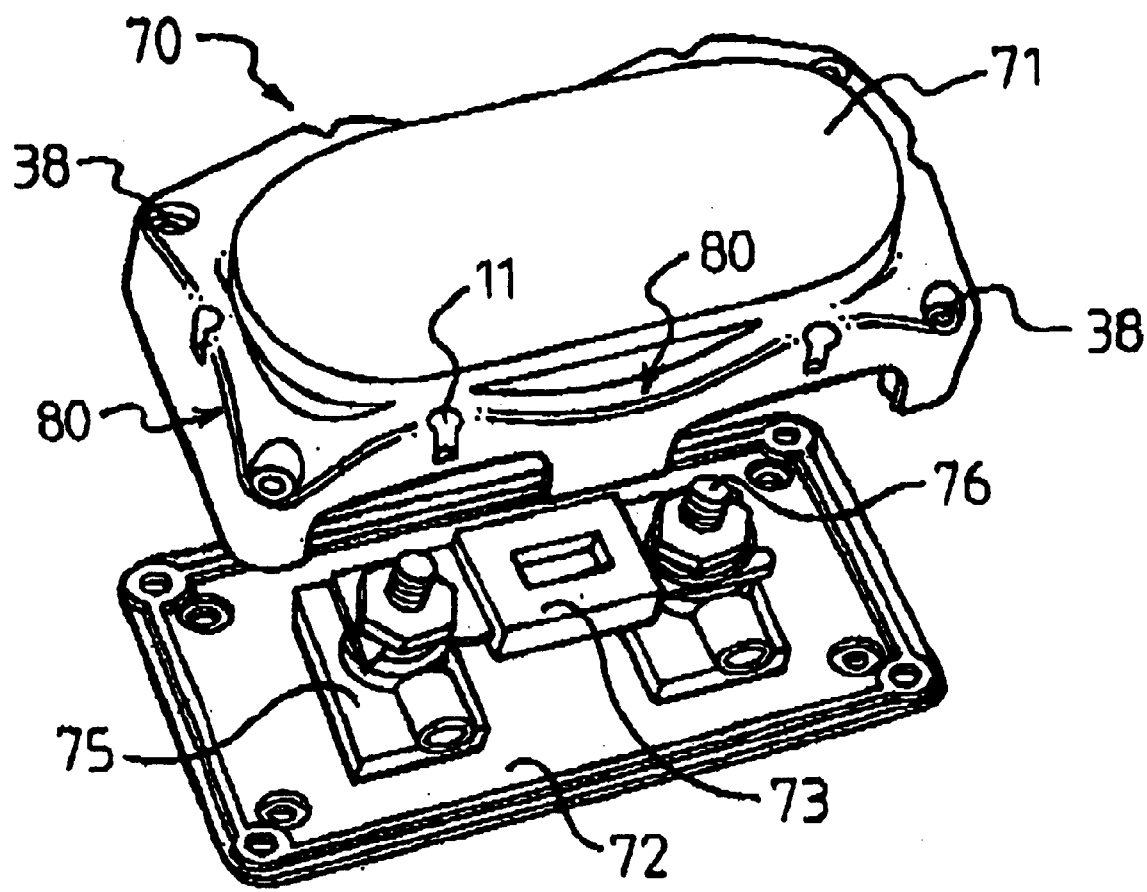
FIG. 11 is an exploded view of a similar rectangular module, this time containing a heavy duty fuse holder.

FIG. 11 shows a similar rectangular contour module 70 hat a cover 71, rectangular base plate 72 and a heavy duty frame holder 73. It would be noted that this module is similar to that of FIG. 10, except that the contour bus has been replaced by the heavy duty fuse holder. Various types of fuses could be used. The fuse holder being separated by studs 75, 76, which are also aligned with the access apertures on each side of cover 71.

It will be noted that a common feature of all of these modules whether they are a square footprint or rectangular footprint is the contoured outer edges of the covers as shown by numeral 80 in FIG. 2a, and the same numeral 80 in FIGS. 9–11. This contoured outer edge 80 is substantially sinuous in that it dips down to a low point adjacent the corner 38 and rises to a high point adjacent the cavity 11 which is symmetrically disposed with respect to the access apertures 6 and their removable cover plate 7, and we refer tot his shape as a "contour lock module".

This sinuous contoured outer portion 80 is both stylistically pleasing, and allows for the provision of the access aperture 6, and/or the joining means 13, so that they be readily positioned in the apertures 11 at the high points of the contoured top edge 80.

Preferably the modular units enable the placement of switches 90, instruments such as ammeters, fault meters, or the provision of voltage sensitive relays, circuit breakers, distributions studs, heavy duty buses, a shunt enclosure, a battery maintainer, or any other electrical component which can be fitted into one of these standard modules.

Although we have illustrated both single modules 50 and double modules 60, it is possible to make other larger modules, based on multiples of the single modules.

It is preferred that the plastic components are manufactured from polycarbonate ABS alloy, to appropriate flame retardant standards. Each of the modules can be a standalone unit, or can be connected together into the distribution system of the type shown in FIGS. 6 and 7. Any single configuration can be used depending upon the number of modules the user wishes to fit together.

Each of the switches lends themselves to the provision of a appropriate label designating the item controlled by the switch and one such label is shown on switch 90 in FIG. 2 with the word "power".

In the preferred embodiment of the invention, the fitting (or fittings), once appropriately wired as desired, will be affixed into position on a particular surface. As mentioned above, examples of such surfaces could include electrical circuit boards or instrument panels. To achieve this fixing means are provided within the housing. To ensure none of the internal circuitry within the housing is affected, it is desirable to position the fixing means around the periphery of the housing. In the example of the invention shown in FIG. 1, screw holes 38 are provided through the housing 2 and base portion 3. Long thread screws 39 or the like may be used, with the screw-head forming a substantially flush finish with the top surface of the housing. If a desired, flush-caps could also be provided and applied, to the top of the screw-heads to ensure a flush finish with the top surface of the housing, thereby providing a more aesthetic finish to the fitting. For example, these could be made of the same material as the housing itself. Alternative fixing means could be provided if desired. For example, base portion 3 could be configured to receive screw brackets or the like.

VARIATIONS

The configuration of the connection plugs 13 may take many shapes and forms. For example, a horseshoe shaped clip could be provided, perhaps constructed of highly-sprung steel or the like, the prongs of which could be inserted into each of the connection cavities of the fits, with the spring action of the clip joining the two fittings together. Ideally whatever form of connection plug is chosen, it should firmly draw the two fittings together.

There are many adaptations of the fitting, particularly of the fitting housing, which may be used to good effect. In another variation of the invention, a particular type of safety key or switch member 4 may be specifically adapted for use in conjunction with the fitting. Ideally it is particularly useful to have a key or switch member which cannot be easily disengaged from the fitting for example, to ensure the key or switch member, once the fitting has been deactivated, does not fall out of the fitting housing if accidentally bumped or, if used in a boat or the like, during rough weather. This may be overcome by adapting the fitting housing to receive, for example, a key, which, when it is desired to activate the fitting, may be first inserted into the fitting housing and then must be depressed into the housing and simultaneously reed to allow the key to move clockwise to a first "safety" position. The key may then continue to be turned clockwise from that first position as desired. To deactivate the fitting and disengage the key, the key must first be turned anti-clockwise to the first position, To complete the removal of the key, the key must again be depressed and simultaneously turned anticlockwise to the release position Only if the key is depressed and simultaneously turned will the key be able to be removed from the fitting.

Although we prefer to use the contour lock modules having a square or rectangular footprint, it is possible to use other geometric shapes, preferably those capable of being abutted together to make a solid block of components. For example, a hexagonal footprint would enable the units to be fitted together as hexagonal cells. However we have found that the illustrated square and rectangular footprints are suited to the provision of electrical equipment on boats, and we prefer to use these shapes.

Finally various alterations or modifications may be made to the foregoing without departing from the spirit or scope of this invention, as set forth in the claims.

What is claimed is:

1. An electrical fitting assembly comprising:

two separable electrical fittings that directly abut each other, each of the two electrical fittings having a base and a housing removably mounted on the base, where the housing has at least one mating side and an open bottom that is closed by the base when the housing is mounted on the base, where the mating side includes an aperture that extends to the open bottom and a mounting face, where the mounting face of one of the electrical fittings directly contacts and is flush with the mounting face of the other of the electrical fittings to enclose the apertures of both electrical fittings, where a removable cover plate closes the aperture, and where an external joining cavity is provided in the mating sides of both fittings; and a resilient joining device that fits into the two external joining cavities and holds the two electrical fittings directly abutting each other.

2. The electrical fitting assembly of claim 1, further comprising a watertight seal sealing said assembly.

3. The electrical fitting assembly of claim 1, wherein each said base is square and each said housing has four sides, at least one of which is said at least one mating side.

4. The electrical fitting assembly of claim 1, wherein said base comprises gripping lugs that frictionally hold said housing on said base.

5. The electrical fitting assembly of claim 1, wherein said resilient joining device is dumb-bell shaped and said external joining cavity of each of said two electrical fittings receives a respective end of said dumb-bell shaped resilient joining device.

6. An electrical fitting assembly comprising:

two separable electrical fittings that directly abut each other, each of said two electrical fittings having a base, a hollow housing removably mounted on said base, said housing having at least one mating side and an open bottom that is closed by said base when said housing is mounted on said base, said at least one mating side comprising a grooved aperture that extends to said open bottom and a mounting face on three sides of said aperture, said mounting face of one of said two electrical fittings directly contacting and being flush with said mounting face of the other of said two electrical fittings adjacent to all three sides of said aperture to enclose said apertures of said two electrical fittings on the three sides, a removable cover plate that closes said aperture and is carried in grooves in said grooved aperture, said cover plate being removable from said aperture by sliding along said grooves toward said open bottom, and an external joining cavity in said at least one mating side; and a resilient joining device that fits into two said external joining cavities of said two electrical fittings and holds said two electrical fittings directly abutting each other.

7. The electrical fitting assembly of claim 6, further comprising a watertight seal sealing said assembly.

8. The electrical fitting assembly of claim 7, wherein each said base is square and each said housing has four sides, at least one of which is said at least one mating side.

9. The electrical fitting assembly of claim 8, wherein said base comprises gripping lugs at four corners of said base that frictionally hold said housing on said base.

10. The electrical fitting assembly of claim 9, wherein said resilient joining device is dumb-bell shaped and said external joining cavity of each of said two electrical fittings receives a respective end of said dumb-bell shaped resilient joining device.

11. The electrical fitting assembly of claim 6, wherein each said base is square and each said housing has four sides, at least one of which is said at least one mating side.

12. The electrical fitting assembly of claim 6, wherein said base comprises gripping lugs that frictionally hold said housing on said base.

13. The electrical fitting assembly of claim 6, wherein said resilient joining device is dumb-bell shaped and said external joining cavity of each of said two electrical fittings receives a respective end of said dumb-bell shaped resilient joining device.

14. The electrical fitting assembly of claim 6, wherein said housing further comprises a switch on a top surface opposite said open bottom.

* * * * *